March 12, 1935.　　　F. J. GROVEN ET AL　　　1,993,961
PORTABLE WELDING MACHINE
Filed Feb. 18, 1932　　　3 Sheets-Sheet 1
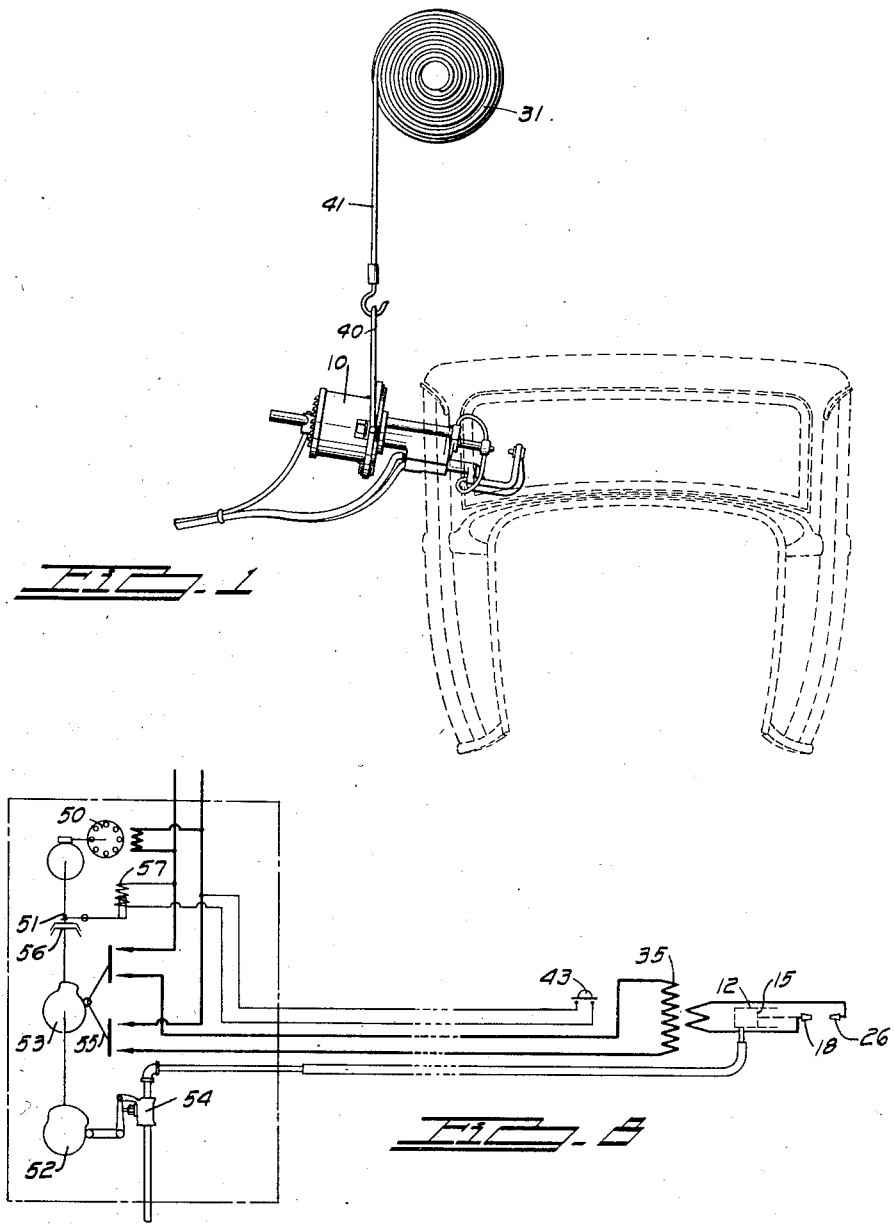
INVENTORS.
F. J. Groven.
BY W. F. Proch.
E. L. Davis.
ATTORNEY.

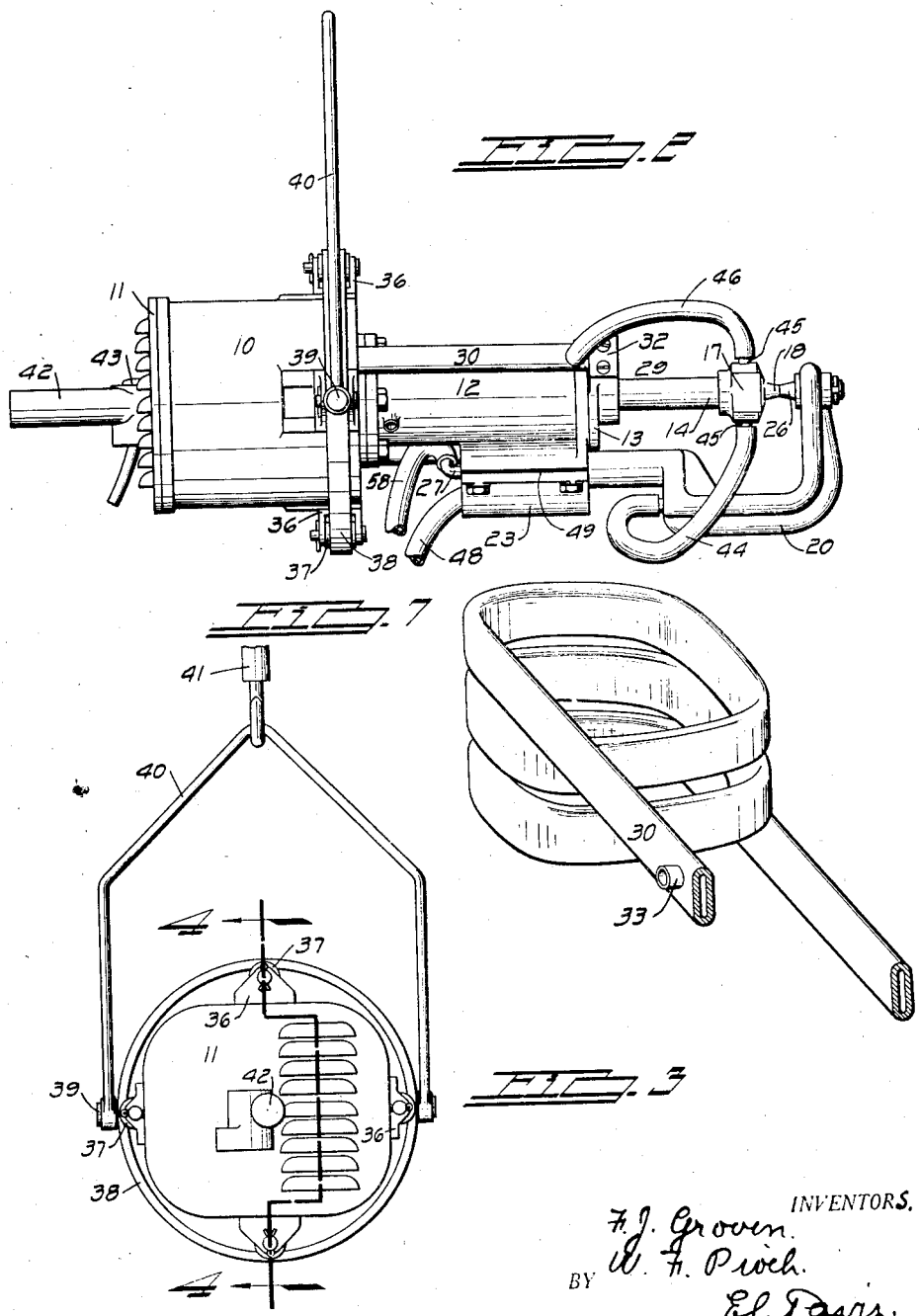

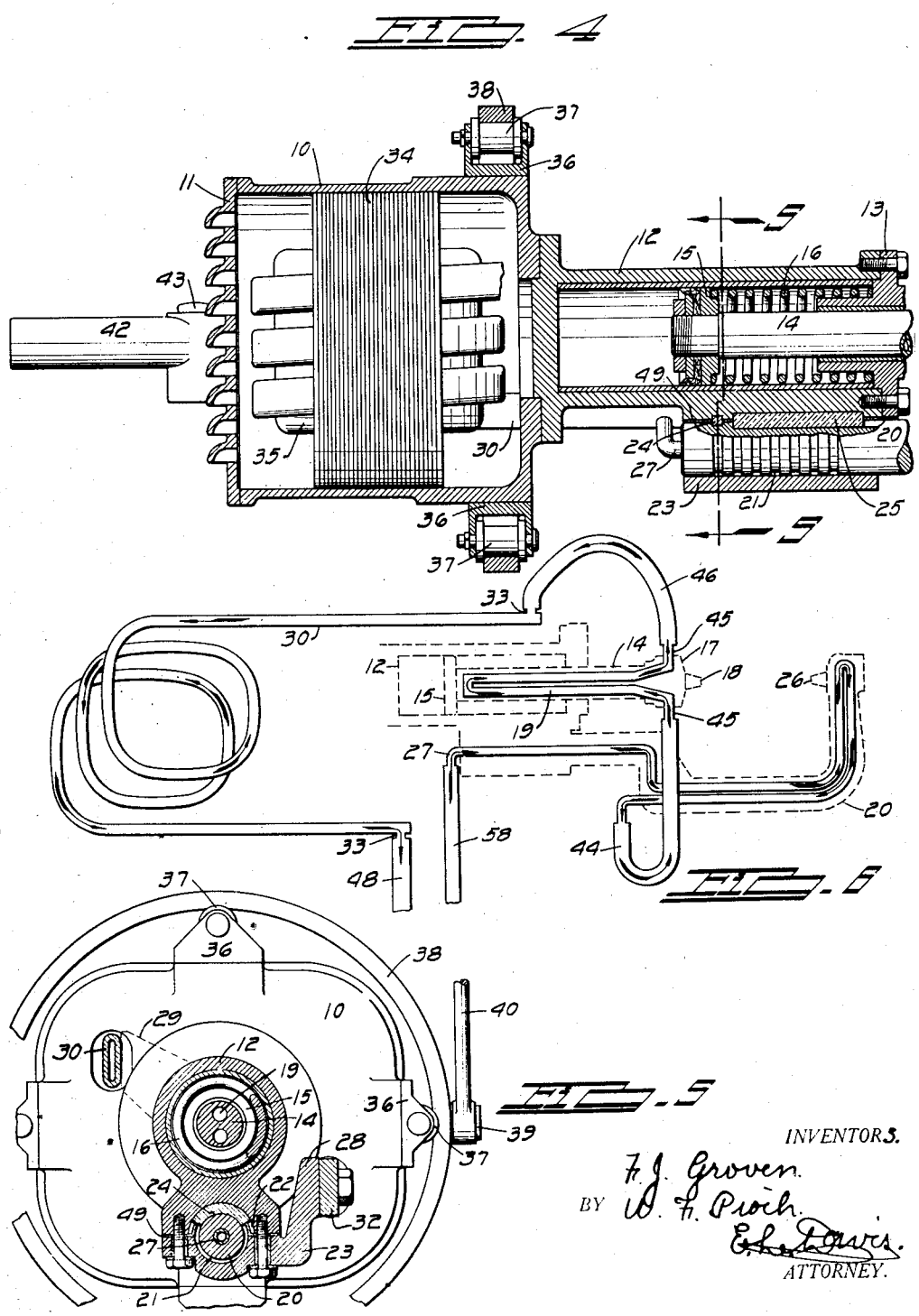

Patented Mar. 12, 1935

1,993,961

UNITED STATES PATENT OFFICE 1,993,961

PORTABLE WELDING MACHINE

Fredrick J. Groven, Highland Park, and William F. Ploch, Detroit, Mich., assignors to Ford Motor Company, Dearborn, Mich., a corporation of Delaware Application February 18, 1932, Serial No. 593,806

5 Claims. (Cl. 219—4)

The object of our invention is to provide a portable welding machine especially adapted for spot welding panels, reinforcing plates and structural members together. This device is particularly suitable for welding the many parts comprising an automobile body together, while the body is being conveyed along an assembly line, in which case it is, of course, impossible to manipulate the body so as to be welded in a conventional spot-welding machine. The feature which distinguishes this device from the older types of portable welders is that we have provided a single unit comprising both the welding transformer and welding head whereby only relatively light weight wires need connect the device. Our device is thus made more portable so that the operator may more easily manipulate the device into the various positions required to make the desired welds. Several novel features make this desirable arrangement possible.

Heretofore, all portable spot welders with which the applicants are familiar have consisted of a relatively stationary transformer located adjacent to the work to be welded and a portable welding head. The primary winding of the transformer is connected to a current source and a pair of flexible secondary leads extend from the secondary winding of the transformer to the portable welding head. These welding heads invariably comprise a pair of electrodes connected to the ends of the respective secondary leads, which electrodes are operatively clamped down over the parts to be welded and the current then turned on. It is well known that a very high amperage current is required to weld even light sheet metal and to weld the several parts of an automobile body the current at the electrodes must be about three thousand amperes. An objectionable feature of such device is that the secondary leads which extend from the transformer to the welding head must be flexible in order that the head may be freely manipulated around the work, while at the same time the leads must be sufficiently large to carry the high-amperage secondary current without undue heating. It has heretofore only been possible to obtain such leads by water cooling the flexible cables over their full length and even then such devices are unwieldy and very inefficient electrically.

Experience has proven to the applicants that when these secondary leads are made sufficiently small so that the welding head is truly portable, then the current loss in the leads is approximately as great as the current consumed in welding. To provide current of 3500 amperes and 4 volts at the welding head it has been necessary to provide between 8 and 8 volts' pressure at the transformer to overcome the inefficiency of the secondary lead. Of course, these cables could be made much heavier and thus cut down this current loss but if such were done the machine would be practically inoperative due to the unwieldiness of the device. Thus, users have had to be content with a high-current loss and the dangers connected with water-cooled leads. Such water-cooled leads are dangerous to use, especially in the hands of ordinary workmen, for reason that if the water supply stops for any reason even for a short interval steam will generate in these cables some times sufficiently to burst their covering and seriously burn the workman operating the device. This danger has been a well recognized objection to the use of such portable welders and one which the applicants' device overcomes.

A further disadvantage with the older type device and one which is not apparent from the casual consideration of these structures is that, when the primary circuit of the transformer is completed, the reaction due to the enormous flow of current through the secondary lead causes the two leads to fly away from each other. This force is sufficient that if such cable should strike a man it would probably cause serious injury. Of course, the two leads can be tied together at intervals to prevent damage due to this reaction, but these leads must be more or less independent of each other to secure the necessary flexibility and so the means for tying these leads together has been heretofore unsatisfactory.

In our improved portable spot welder the several aforementioned disadvantages have been eliminated. There are no flexible leads used through which an amperage current is conducted so that the excessive cost of such flexible leads is eliminated, the danger of such leads bursting and scalding the operators prevented, and by eliminating these leads the high-current loss heretofore unavoidable has been reduced. We are able to eliminate these secondary leads by providing a unitary device consisting of a welding transformer and welding head which unit is mounted in a novel manner so as to permit universal movement of the unit. The operator is free to manipulate this unit much easier than was heretofore possible with the older type devices.

Of course, the combination of a transformer and welding head is not new, however, it is believed that the device about to be described is the first disclosure of such combination which is sufficiently portable to be used as a portable spot welder. This increased portability results from the reduced weight of the device and this reduced weight results from the greater efficiency of our transformer, particularly the novel secondary winding and the elimination of flexible leads in the secondary circuit.

With these and other objects in view our invention consists in the arrangement, construction and combination of the various parts of our improved device, as described in the specification, claimed in our claims, and illustrated in the accompanying drawings, in which:

Figure 1 shows a view of our device installed in position to weld an automobile body.

Figure 2 shows a side elevation of our improved welding unit.

Figure 3 shows a rear elevation of the device, shown in Figure 2.

Figure 4 shows a sectional view, taken on the line 4—4 of Figure 3.

Figure 5 shows a sectional view, taken on the line 5—5 of Figure 4.

Figure 6 shows a schematic diagram illustrating the water cooling system of the device.

Figure 7 shows a perspective view of our improved secondary winding, and

Figure 8 shows a wiring diagram of the device and controller used with same.

Referring to the accompanying drawings, we have provided a rectangular shaped housing 10 having a removable cover 11 secured over the rear face thereof, which housing encloses our transformer. A cylinder 12 is fastened to the forward face of the housing 10 and is provided with a cylinder head 13 on its open end which forms a bearing for a piston rod 14, reciprocally mounted therein. A piston 15 is secured to the inner end of the rod 14 and a compression spring 16 is disposed between the head 13 and piston 15 to thereby resiliently urge the piston and rod towards the transformer or rear end of the cylinder. The rod 14 extends outwardly through the cylinder head 13 and an electrode holder 17 is machined on the forward end thereof and an electrode 18 is inserted in this holder whereby reciprocation of the piston 15 will reciprocate the electrode 18. It may be well to mention that the piston rod 14 is provided with a pair of openings 19 extending longitudinally therethrough, the rear ends of these two openings being connected together and the forward ends being connected to suitable hose connections 45 extending from opposite sides of the electrode holder 17, whereby water forced through one of these connections will circulate to the rear end of the rod 14 and back to thereby cool this shaft.

A second electrode is provided and to support same we have formed an L-shaped arm 20 secured to the side of the cylinder 12 but insulated therefrom. It will be noted that the shank portion of the arm 20 is machined as a shaft having a plurality of annular grooves 21 therein, which shank is adapted to fit in a semi-circular socket 22 machined on the cylinder 12 and to be clamped therein by means of a cap 23. The cap and shank are insulated from the cylinder 12 by suitable fiber or other sheet insulation 49. It will be further noted that a crescent-shaped key 24 is sunk in the socket 22 which selectively coacts with any one of the grooves 21 whereby the longitudinal position of the arm relative to the cylinder may be adjusted. This key is constructed of insulating material as is likewise a longitudinally extending key 25 which is disposed between the shank and socket whereby the outer end of the arm is held in a fixed position relative to the electrode 18. An electrode 26 is secured in the outer end of the arm 20 in alignment with the electrode 18 and forms an abutment against which the electrode 18 coacts when the piston 15 is moved to its outermost position. The arm 20 is constructed as a casting with a tube 27, as shown in Figure 6, cast therein. It will be seen that this tube extends through the shank portion of the arm around to the electrode end thereof and then back to a position adjacent to the shank whereby water circulated through this tube will effectively cool the arm over its full length.

From the foregoing it will be seen that when air pressure is applied to the rear of the piston 15 the rod 14 will be forced outwardly against the action of the spring 16 so that the electrodes 18 and 26 will be brought in contact with each other. A high-amperage current must be supplied to these electrodes and this is arranged by providing a bracket 28 which extends from the cap 23 and a second bracket 29 which extends from the cylinder head 13. It will be noted from Figure 5 that these brackets are on opposite sides of the cylinder 15, the bracket 28 being somewhat below the center of the cylinder while the bracket 29 is somewhat above and on the opposite side thereof. These brackets are so positioned to connect the terminals of a novel secondary winding which extends directly from our transformer which is mounted in the housing 10 through suitable openings in the forward face of the housing.

Our secondary winding is formed by taking about a six-foot length of standard ¾ inch copper pipe 30 and running it between rolls to flatten the cross section thereof so that an opening approximately ⅛ of an inch thick by 1 inch long extends through the pipe. This flattened pipe is bent in the form of a rectangular-shaped spiral comprising three turns, as shown in Figure 7. The ends of the pipe 30 are provided with a terminal block 32 whereby they may be secured to the brackets 28 and 29. Suitable hose connections 33 are welded or brazed to the ends of the pipe so that water may be conducted through the entire length of the spiral winding.

A novel feature of this construction is that this secondary winding is adapted to support the transformer in the housing 10. The transformer proper consists of a plurality of conventional laminations 34, built up into a figure 8-shaped core with a primary winding 35 disposed around the center section of this core. The secondary winding 30 is disposed around the outside of the primary 35 and the whole unit assembled into the housing 10 so that the two ends of the pipe 30 extend forwardly through suitable clearance openings in the housing 10 in position where they may be secured to the brackets 28 and 29. Longitudinal movement of the transformer in the housing 10 is thus prevented by these brackets.

From the foregoing it will be seen that when current is conducted through the primary winding 35 the secondary winding 30 will be energized with a low-voltage high-amperage current which will be conducted directly to the brackets 28 and 29, from which it will be conducted to the electrodes 26 and 18. It will be noted that no flexible leads are used in the secondary circuit of this device so that an extremely high efficiency is produced thereby, which efficiency is not believed obtainable with any of the portable welders heretofore disclosed.

The following data is given as the average of a number of tests conducted on one of a number of these devices constructed by the applicants and shows the remarkable efficiency obtained with this design of machine.

| Volts | Amperes | K. V. A. | K. W. | Power factor |
|---|---|---|---|---|
| 212 | 120 | 25.4 | 17.2 | 65.5% |

The above readings were taken with full air pressure on the piston and two .040 inch steel plates between the electrodes. The duration of each test was from 1.5 to 2 seconds and the readings on the ammeter and voltameter were not surges but actual steady readings.

The applicants found through experimenting with numerous types of welding machines that the current consumed with their machine under full load is actually less than the current loss in the transformers and flexible leads of any of the several portable spot welders now on the market. This conclusion was arrived at by reading the current consumed in these several devices when the electrodes were apart with the primary windings energized. More current was consumed in every one of these devices with an open secondary circuit than was consumed by the applicants' transformer with a closed secondary circuit. It is needless to say that in every other transformer for this purpose tested, the current required to weld was many times that required in the applicants' machine and that the current loss on open circuit was correspondingly many times the loss in the applicants' transformer under the same conditions.

The reason for this high efficiency obtained by the applicants is not because of superior workmanship but because in their device only a small transformer is required to produce the requisite amount of current at the electrodes, whereas in all other portable welders a transformer several times as large is required to produce the required current at the electrodes, due to the enormous current loss in the flexible secondary leads which connect the welding head with the transformer. The current loss on open circuit is roughly proportional to the size of the transformer, wherefore the reduced loss in the applicants' device; while the excessive current loss on welding with the older devices resulted from the large current loss in the secondary circuit.

It will be understood, of course, that all of the devices compared had substantially the same welding capacity and that the lesser weight of the applicants' machine is not due to its smaller capacity but to the greater efficiency obtainable with this arrangement of elements and superior design of apparatus. Experience has proven that working eight hours daily, each welder of the applicants saves about 120 k. w.-hours over any other similar device available which represents about three dollars actual saving.

Now in order that this device may be readily manipulated around an automobile body applicants have provided a novel mounting therefor. Four brackets 36 are secured one to each side of the housing 10 adjacent to its forward face and in a plane with the center of gravity of the whole unit, and in each of these brackets a spool-shaped roller 37 is mounted. An annular track or ring 38 is provided in which these rollers run and the ring itself is provided with a pair of trunnions 39 extending from diametrically opposite points therearound. These two trunnions are pivotally secured in the ends of a bail 40 which is adapted to be hung from a suitable cable 41. One of the numerous counter-weighted or spring balancing suspension devices, as shown at 31 in Figure 1, is readily adapted to support the device so that it may be raised or lowered as desired. So that the unit may be guided, a handle 42 which is secured to the rear face of the cover 11 is provided, in which handle a switch button 43 is located whereby the operator by pressing the button 43 may operate a suitable relay which completes an electrical circuit through the primary winding of the transformer.

The aforementioned relay and associated control mechanism will not be described in detail in this specification, as it is believed to form a separate invention and because manual operation of the device is feasible, if not commercially desirable. However, in order that the operation of this welder be fully disclosed the electrical hook-up of the control panel used herewith is described.

Referring to Figure 8, we have provided a control panel having a small motor 50 mounted thereon which is arranged to drive a cam shaft 51 at a reduced speed. An air valve operating cam 52 together with a switch operating cam 53 are secured on this shaft, the cam 52 actuating an air valve 54 while the cam 53 actuates a double-pole switch 55. This air valve and switch are connected to the air cylinder and primary winding, respectively, of the welding unit through a suitable air hose and pair of small flexible wires and the cams are so proportioned that rotation of the cam shaft will first open the air valve, then complete the primary circuit, then break the primary circuit, and then close the air valve to produce the desired weld.

In order that the operation of this device may be under the instant control of the operator a clutch 56 is interposed between the cams and the motor drive, which clutch is designed so that after being thrown in, it will make one complete revolution and then automatically disengage itself, similar to the well known stamping press clutches. A solenoid 57 is provided to operate this clutch and the push button 43 is connected to energize the solenoid. Thus, when it is desired to operate the welder the motor 50 is first turned on and then the unit is ready to operate. Upon pressing the button 43 the clutch 56 is engaged for one revolution which first operates the air cylinder to bring the electrodes together, then completes the primary circuit for the required time, and then disconnects the air so that the electrodes will separate.

It will be noted that two primary lead wires, and air hose, and the push button relay wires must extend from the portable unit to the stationary control box, but all of these wires together are only a small fraction of the size of one flexible lead wire capable of transmitting the high-amperage welding current, as formerly done. The size of the wire is about proportional to the amperage carried and the amperage in the primary circuit of this device is less than one-fiftieth of the secondary amperage. Consequently, these wires are a little larger than an ordinary lamp cord.

Referring now to Figure 5, it will be seen that a very efficient cooling system is provided for this device. A cooling fluid, preferably water, is introduced through a flexible rubber tube 58 into one end of the tube 27 whereby this cooling fluid will flow through the arm 20 and thus cool the arm and electrode 26. A flexible rubber hose 44 connects the other end of the tube 27 with one of the connections 45 in the reciprocating electrode holder 17 so that the fluid is then conducted through the openings 19 to cool the full length of the piston rod 14. Another rubber hose 46 connects the remaining fitting 45 with one end of the connections 33 in the secondary winding whereby the cooling fluid is run through the full length of this conductor. A hose 48 forms the return line for this fluid. It will thus be seen that all of the current conducting parts of this device are efficiently cooled so that their size may be materially lessened without causing undue heating to make the device adapted for use as a portable welder.

Among the many advantages arising from the use of our improved device, it may be well to mention that we have provided portable welding device in which the use of flexible high-amperage leads is eliminated. Further, the novel secondary winding provided with our transformer is not only light in weight but of such high efficiency that a very small transformer may be used therewith and still secure the requisite amount of current for the weld intended. Still further, the novel mounting provided for supporting this device is believed to comprise an important feature in connection with this machine which makes the unit truly portable.

Some changes may be made in the arrangement, construction and combination of the various parts of our improved device without departing from the spirit of our invention and it is our intention to cover by our claims such changes as may reasonably be included within the scope thereof.

We claim as our invention.

1. A portable welding unit comprising a unitary housing and welding head, said housing having a transformer disposed therein, a ring encircling said housing in the plane of the center of gravity of the unit, means for rotatably mounting the housing in said ring, and means for pivotally supporting said ring upon a horizontal axis extending diametrically therethrough for the purpose described.

2. A portable welding unit comprising a unitary housing and welding head, said housing having a transformer disposed therein, a ring encircling said housing, spool-shaped rollers secured on the housing and coacting with said ring to anti-frictionally rotatably mount the unit in the ring, and means for pivotally supporting said ring upon a horizontal axis extending diametrically therethrough for the purpose described.

3. A portable welding unit comprising, a housing having an air cylinder rigidly secured to the forward face thereof, an arm secured to said cylinder and extending forwardly therefrom, a piston and rod reciprocally mounted in said cylinder, a pair of electrodes fixedly secured to said rod and arm in alignment with said cylinder whereby actuation of said piston will bring said electrodes into contact with each other, and a transformer disposed in said housing having a secondary winding extending outwardly through suitable openings in the forward face of the housing and electrically connected to said arm and piston rod.

4. A portable welding device comprising, a housing having a transformer mounted therein, the secondary winding of said transformer being formed from a rigid tubular conductor, a welding head secured to said housing having a pair of brackets one extending from each side thereof and each electrically connected to the electrodes in said head, and means for fixedly securing the ends of said tubular conductor to said brackets whereby said transformer is supported within said housing, and means for conducting cooling fluid through said conductor for the purpose described.

5. A portable welding device comprising a transformer having a tubular secondary winding, an air cylinder fixedly secured to said transformer having a piston rod reciprocally mounted therein upon the outer end of which an electrode is disposed, said rod having a cooling fluid passageway extending the length thereof, an arm secured to said cylinder and extending forwardly to support the other of the electrodes, said arm having a tube cast therein and extending the length thereof, flexible tubing connecting said cooling tube and fluid passageway and tubular conductor in series, and means for conducting cooling fluid through said elements so connected.

FREDRICK J. GROVEN.
WILLIAM F. PIOCH.